US009201666B2

(12) United States Patent
Zaragoza et al.

(10) Patent No.: US 9,201,666 B2
(45) Date of Patent: Dec. 1, 2015

(54) SYSTEM AND METHOD FOR USING GESTURES TO GENERATE CODE TO MANIPULATE TEXT FLOW

(75) Inventors: Richard Ignacio Zaragoza, Issaquah, WA (US); Steven Wayne Ickman, Snoqualmie, WA (US); William Lawrence Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/161,739

(22) Filed: Jun. 16, 2011

(65) Prior Publication Data

US 2012/0324332 A1 Dec. 20, 2012

(51) Int. Cl.

| | |
|---|---|
| G06F 17/00 | (2006.01) |
| G06F 3/033 | (2013.01) |
| G06F 9/44 | (2006.01) |
| G06F 3/0488 | (2013.01) |
| G06F 3/01 | (2006.01) |
| G06F 3/0354 | (2013.01) |
| G06F 17/21 | (2006.01) |
| G06T 11/60 | (2006.01) |
| G06F 17/24 | (2006.01) |

(52) U.S. Cl.
CPC .............. *G06F 9/4443* (2013.01); *G06F 3/017* (2013.01); *G06F 3/0354* (2013.01); *G06F 3/0488* (2013.01); *G06F 17/211* (2013.01); *G06F 17/242* (2013.01); *G06T 11/60* (2013.01)

(58) Field of Classification Search
CPC . G06F 17/30905; G06F 17/212; G06F 17/50; G06F 17/211
USPC .......................................................... 715/234
See application file for complete search history.

(56) References Cited

U.S. PATENT DOCUMENTS

| | | | |
|---|---|---|---|
| 4,829,470 A | 5/1989 | Wang | |
| 5,227,770 A | 7/1993 | Freeman | |
| 5,805,170 A | 9/1998 | Burch | |
| 6,081,816 A | 6/2000 | Agrawal | |
| 7,423,659 B1 | 9/2008 | Pratley et al. | |
| 7,555,711 B2* | 6/2009 | Chao et al. ..................... | 715/246 |
| 7,684,619 B2 | 3/2010 | Sprang et al. | |
| 7,721,196 B2 | 5/2010 | Tilford et al. | |
| 2010/0138739 A1* | 6/2010 | Sprang et al. ................. | 715/247 |
| 2010/0251189 A1* | 9/2010 | Jaeger ............................ | 715/863 |

OTHER PUBLICATIONS

Kaushik, Use CSS Text Wrapper to wrap text in any shape, Nov. 6, 2008, Instantfundas.com, pp. 1-2.*
Ajaxian, CSS Text Wrap: Squeeze that text around any line, Dec. 19, 2007, ajaxian.com, pp. 1-2.*
Rob Swan, Sliced and Diced Sandbags, Aug. 22, 2006, alistapart. com, pp. 1-10.*
Tory Lawson, "CSS—Wrapping text around non-rectangular shapes," Jun. 1, 2011, http://torylawson.com, p. 1-4.*
Lin, Xiaofan, "Intelligent Content Fitting for Digital Publishing", Retrieved at http://citeseerx.ist.psu.edu/viewdoc/download?doi=10. 1.1.86.7548&rep=rep1&type=pdf>>, SPIE Conference on Digital Publishing, Jan. 15-19, 2006, San Jose, CA, USA, pp. 10.

* cited by examiner

*Primary Examiner* — Kavita Padmanabhan
*Assistant Examiner* — Ariel Mercado
(74) *Attorney, Agent, or Firm* — Steve Wight; Sandy Swain; Micky Minhas

(57) ABSTRACT

The subject disclosure is directed towards using gesture input to position content elements (e.g., flow text) around an object such as an irregularly shaped image. The gesture input may be used to generate markup language code, which when processed by a renderer, automatically positions the elements based upon the markup language code. For example, div elements may be generated in HTML code, with margins set to values based upon the gesture so as to position the one or more content elements when they are rendered.

15 Claims, 7 Drawing Sheets

SYSTEM AND METHOD FOR USING GESTURES TO GENERATE CODE TO MANIPULATE TEXT FLOW

BACKGROUND

Instead of rectangular columns, some commercial publications such as magazines or brochures often mix text and images freely on a page. Rather than leaving a rectangular area around each image with a lot of empty white space, text flows naturally around the actual boundary of the image.

At present, flowing text around an irregular image using contemporary, known software can only be done by having a user perform a lot of work to specify the irregular boundary of the shape. To do this, the user manipulates a device such as a mouse to indirectly create a set of curves that resemble the image boundary. This is very difficult because of the inability to accurately capture the intent of the user. Alternatively, the user may insert tabs and spaces into the text to manually move where each line of text starts and/or ends, but this is time-consuming.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which gesture input is used to position content elements (e.g., flow text) around an object such as an image. In one implementation, the gesture input is used to generate markup language code, which when processed by a renderer, automatically positions the elements based upon the markup language code.

In one aspect, a sensing mechanism (such as a touch-screen display/tablet) provides data corresponding to gesture input to logic that is configured to process the data to position content elements relative to the gesture input. For example, the gesture input may trace a curve relative to an image contour, and the logic may process the data to flow text relative to the curve so as to appear to flow the text based upon the image contour. The gesture may be made by a touch-sensitive display, with the gesture input corresponding to a finger or stylus gesture, and/or may be sensed from pointing device movement.

In one implementation, markup language code may be generated to position the content elements. More particularly, for example, div elements may be generated in HTML code, with margins set to values that position the one or more content elements when they are rendered. Two or more vertically adjacent div elements that are within a threshold alignment distance (e.g., a number of pixels) of one another may be made into an aligned set, which may be encoded into a single div element with an increased height.

The logic may determine where to position the content elements relative to the gesture. For example, the logic may infer where to position the content elements relative to the gesture based upon a left or right position of the gesture relative to an imaginary center line. The logic may determine where to position the content elements relative to the gesture based upon secondary input, e.g., a multi-touch input, a specific user-provided setting, and so on.

The gesture input may correspond to a pinching, stretching or rotation gesture on a touch-sensitive display screen. The logic may perform translation, scaling and/or rotation to modify a shape containing the content elements into a modified shape, with the content elements repositioned relative to the modified shape. If the gesture input traces a curve relative to a displayed object, and the displayed object is moved to a changed position, the logic repositions the content elements relative to the changed position.

In one aspect, upon receiving data corresponding to gesture input, markup language code is generated based upon the gesture input. The markup language code is then processed to render output that is based at least in part upon the gesture input. For example, the generated code may comprise HTML div elements having position data that is based upon the gesture input; when the div elements and content elements are provided to an HTML renderer, the renderer outputs the content elements relative to the position data of the div elements.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using information input by a gesture (input by any pointing device or the like, including a finger) to automatically flow content (e.g., text) and/or generate code. The code may, for example, automatically flow text around an image if the gesture traces an outline of that image.

It should be understood that any of the examples described herein are non-limiting examples. For one, while text is used as an example of content that may be flowed, any element may similarly be flowed. Further, the examples are directed towards using gestures to position elements on a page or the like, however other uses of gestures to position elements (e.g., to build a virtual environment in a game, modeling scenario or the like) may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing in general.

Figure 1:
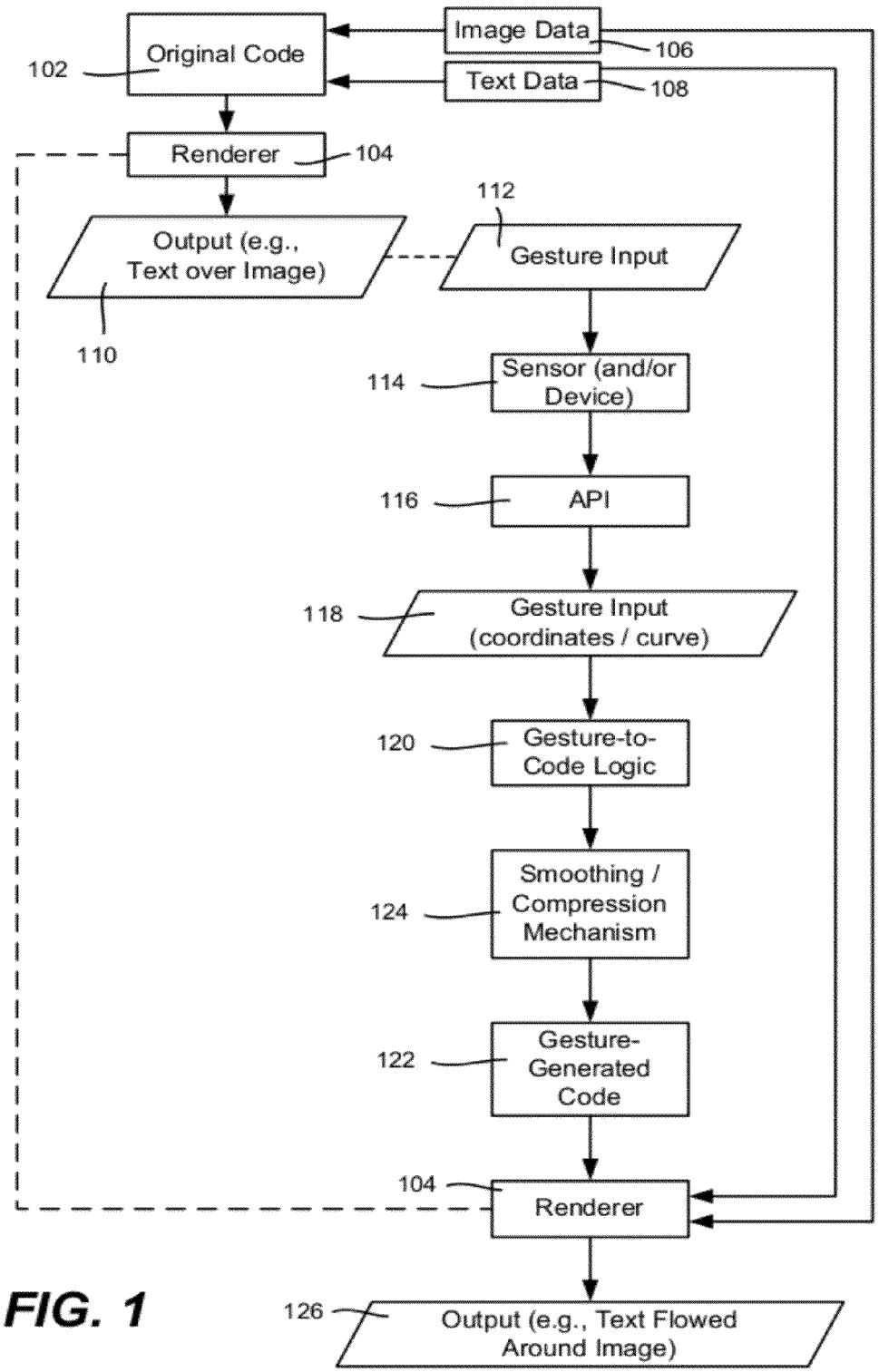
FIG. 1 is a block diagram showing example components for processing gesture input to generate code and/or flow content elements based upon the gesture input.

FIG. 1 is a block diagram showing example components of one gesture-to-code generation system. Original code 102 such as HTML code, when processed and rendered by a browser/renderer 104, accesses image data 106 and text data 108 (after retrieving from a source if needed). When rendered the image and text output 110 appears as an image overlaid with text.

Figure 2:
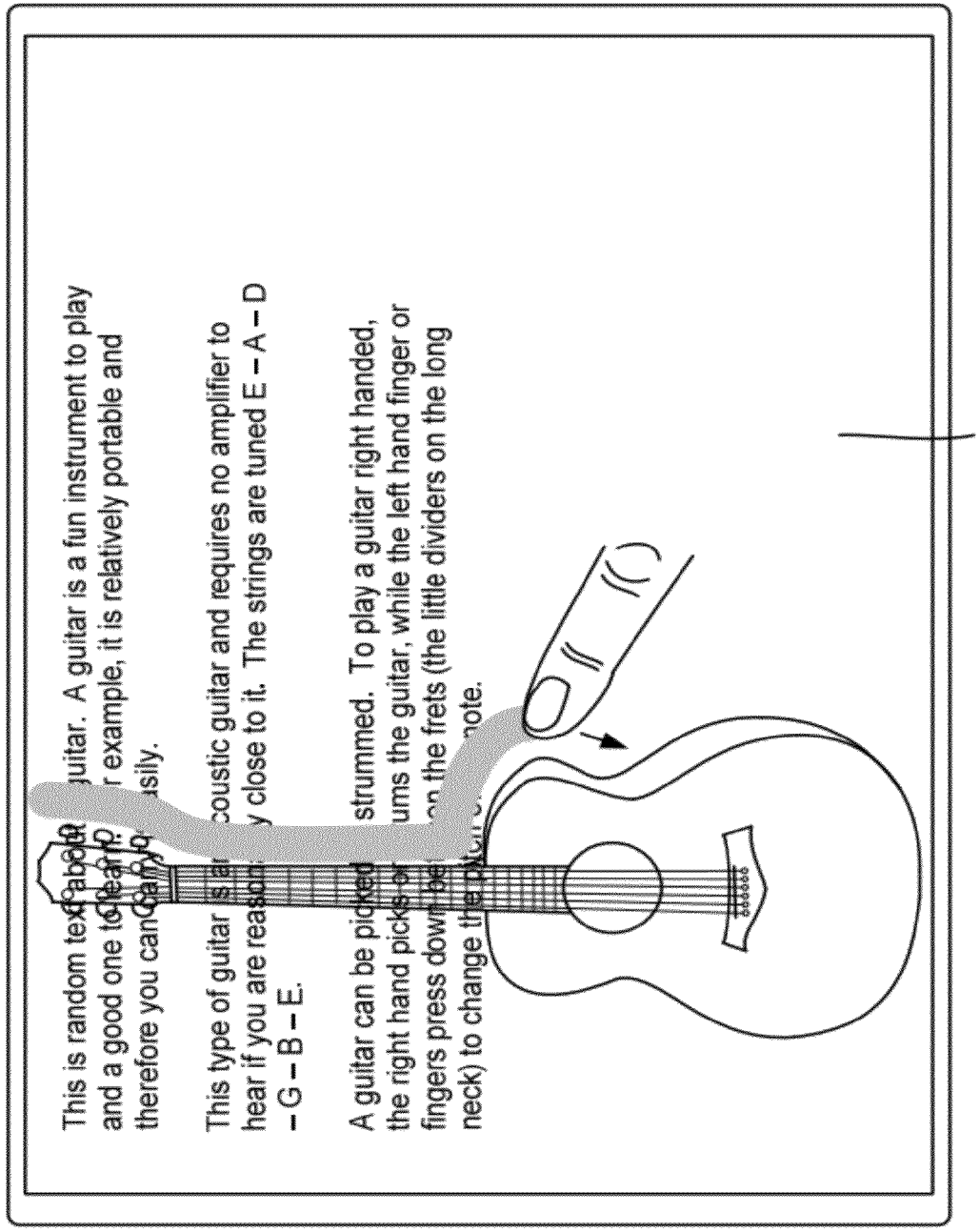
FIG. 2 is an example representation of receiving a gesture input trace relative to a contour of an irregular displayed image object.

A user inputs a gesture 112 using a suitable pointing mechanism comprising a sensor 114 (and/or possibly a device, e.g., mouse), such as a finger or stylus on a touch-sensitive display screen. FIG. 2 shows a gesture in progress on a touch-sensitive display screen 230 as represented by the arrow below the fingertip. In addition to a finger, possible gestures include dragging a mouse, maneuvering a stylus while holding it down on a digitizing pad, and so forth. Note that gestures made without any physical pointing device and/or surface contact also may be sensed, e.g., by depth camera-based technology (where the camera is the sensor); such "air" gestures also may serve as suitable input to the system.

In general, gesture input is received (e.g., via an API 116) into a computer message queue or the like as data including sets of coordinates 118. As described herein, the sets of coordinates may correspond to a curve, which is processed by gesture-to-code logic 120, comprising programming code (e.g., script) that generates new gesture-generated code 122 corresponding to modifications to the original code. The gesture-generated code 122 may be smoothed/compressed (block 124) in some way, such as using some form of lossy run-length encoding or any other continuous curve (e.g. Bezier) techniques as described below. Note that the smoothing/compression may be performed before and/or after combining with the original code.

Figure 3:
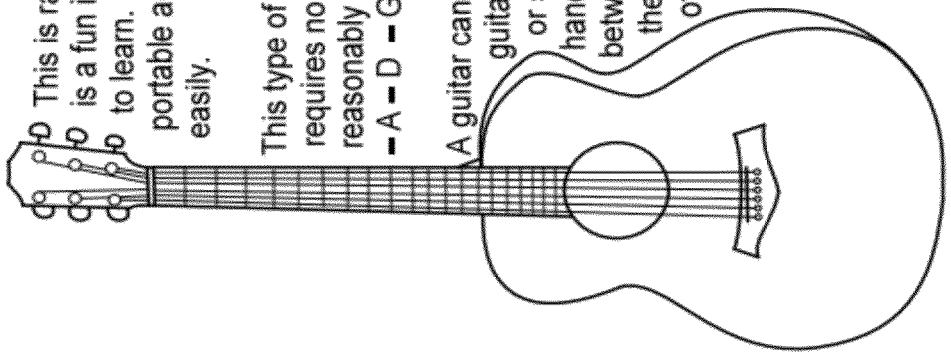
FIG. 3 is an example representation of flowing text relative to gesture input.

In the example of FIGS. 1 and 2, the gesture-generated code 122, when processed and rendered by the browser/renderer 104, accesses the image data 106 and text data 108. When rendered, the image and text output 126 appears as an image with the text flowed according to the gesture curve, e.g., around the image as represented in FIG. 3. Note that instead of or in addition to text content, the curve may be used to flow other content elements, e.g., text, images and/or icons may flow according to an input curve.

It should be noted that the user need not complete the gesture before the code is generated and used to render the text-flowed output. In other words, the text may begin flowing around the image while the gesture is still in progress, e.g., partial text flow states between those represented in FIG. 2 and FIG. 3 may exist.

In one implementation, the gesture-generated code is generated to include HTML div elements, with positioning information corresponding to the gesture coordinates. In general, a browser adjusts text position for each div element, and thus by including div elements with appropriate positioning parameters in the code, the text flows with the gesture. Alternatively, a program such as a word processor can compute tabs, columns, tables, margins and so forth to flow text (or other content) according to gesture input.

The following is an example of actual HTML code that a browser may process into image and text output, with script that adjusts text by inserting and positioning div elements based upon a gesture input:

```
<html>
<body>
<img id="image" src="http://madeupsite.com/wp-content/uploads/2011/03/guitar.jpg" width="300"/>
<div id="textBlock" style="width:600; position:absolute; left:0px; top:0px; z-index: 1">
<p>
This is random text about a guitar. A guitar is a fun instrument to play and a
good one to learn. For example, it is relatively portable and therefore you can
carry it easily. </p>
<p>
This type of guitar is an acoustic guitar and requires no amplifier to hear if you
are reasonably close to it. The strings are tuned E - A - D - G - B - E. </p>
<p>
A guitar can be picked or strummed. To play a guitar right handed, the right
hand picks or strums the guitar, while the left hand finger or fingers press down
between the frets (the little dividers on the long neck) to change the pitch of the
note.</p>
</div>
<div id="mouseCap" style="width:600; height:1000px; position:absolute; left:0px; top:0px; z-index: 2"></div>
    <script src="http://ajax.aspnetcdn.com/ajax/jQuery/jquery-1.4.4.min.js" type="text/javascript"></script>
    <script type="text/javascript">
        $(document).ready(function ( ) {
            // Add divs
            var count = Math.ceil($("#image").height( ) / 5);
            for (var i = count – 1; i >= 0; i--) {
                $("#textBlock").prepend("<div id='row" + i +
'''    style='float:left;clear:left;height:5px;width:5px'></div>");
            }
            // Setup editing event handlers
            var editing = false;
            $("#mouseCap").mousedown(function( ){
                editing = true;
            }).mouseup(function( ){
                editing = false;
            }).mouseout(function( ) {
                editing = false;
            }).mousemove(function(event) {
```

```
                    if (editing) {
                        var row = Math.floor(event.pageY / 5);
                        if (row < count && event.pageX > 5) {
                            $("#row" + row).css("margin-left",
(event.pageX – 5) + "px");
                        }
                    }
                });
            });
        </script>
    </body>
</html>
```

Figure 4:
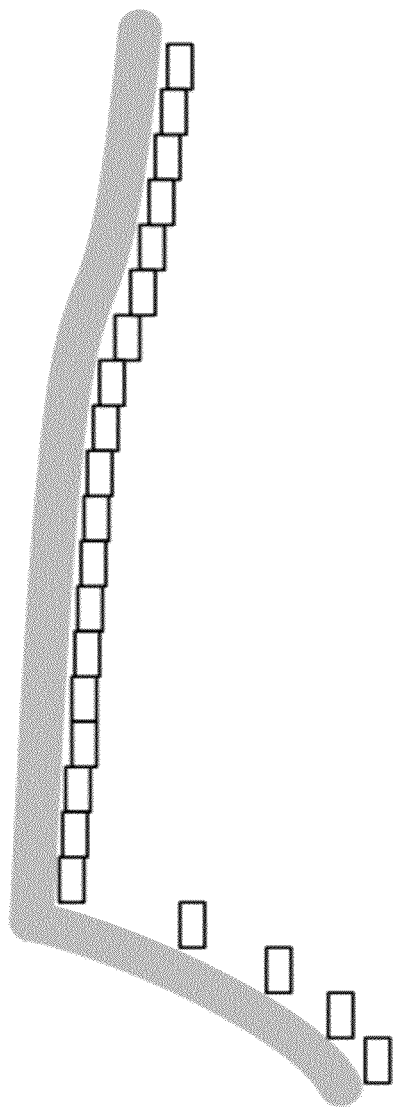
FIG. 4 is a representation of div elements generated for a gesture input curve.

In general, the code effectively determines the left (or right) margin position of various rectangles based upon where the gesture traversed a grid of pixels, as generally represented in FIG. 4. These rectangles correspond to the div elements, with the margins pushed to the curve. While a resolution as fine as a single pixel may be used for each rectangle, a larger number (e.g., four or five pixels, or any appropriate unit of measurement) may be used for the div element height, with a width of one or two pixels for example. The div element height may be based on the text line height, for example.

The following table shows example code (div elements) generated after a gesture (generally similar to the gesture of FIG. 2; however note that FIG. 2 is only an illustration/simulation, not an actual captured gesture and thus the div element parameter values will differ for different actual gestures):

```
<body>
    img id="image" src="http://the-guitarplayer.com/wp-content/uploads/2009/03/taylor.jpg"
        width="300">
    <div id="textBlock" style="width: 600; position: absolute; left: 0px; top: 0px; z-index: 1">
        <div id="row0" style="float: left; clear: left; height: 5px; width: 5px;">
        </div>
        <div id="row1" style="float: left; clear: left; height: 5px; width: 5px;">
        </div>
        <div id="row2" style="float: left; clear: left; height: 5px; width: 5px;">
        </div>
        <div id="row3" style="float: left; clear: left; height: 5px; width: 5px; margin-left: 226px;">
        </div>
        <div id="row4" style="float: left; clear: left; height: 5px; width: 5px; margin-left: 223px;">
        </div>
        <div id="row5" style="float: left; clear: left; height: 5px; width: 5px;">
        </div>
        <div id="row6" style="float: left; clear: left; height: 5px; width: 5px; margin-left: 219px;">
        </div>
        <div id="row7" style="float: left; clear: left; height: 5px; width: 5px; margin-left: 218px;">
        </div>
        <div id="row8" style="float: left; clear: left; height: 5px; width: 5px;">
        </div>
        <div id="row9" style="float: left; clear: left; height: 5px; width: 5px; margin-left: 214px;">
        </div>
        <div id="row10" style="float: left; clear: left; height: 5px; width: 5px; margin-left: 213px;">
        </div>
        <div id="row11" style="float: left; clear: left; height: 5px; width: 5px; margin-left: 210px;">
        </div>
        <div id="row12" style="float: left; clear: left; height: 5px; width: 5px;">
        </div>
        <div id="row13" style="float: left; clear: left; height: 5px; width: 5px;">
        </div>
        <div id="row14" style="float: left; clear: left; height: 5px; width: 5px;">
        </div>
        <div id="row15" style="float: left; clear: left; height: 5px; width: 5px;">
        </div>
        <div id="row16" style="float: left; clear: left; height: 5px; width: 5px;">
        </div>
        <div id="row17" style="float: left; clear: left; height: 5px; width: 5px;">
        </div>
        <div id="row18" style="float: left; clear: left; height: 5px; width: 5px; margin-left: 205px;">
        </div>
        <div id="row19" style="float: left; clear: left; height: 5px; width: 5px; margin-left: 206px;">
        </div>
        <div id="row20" style="float: left; clear: left; height: 5px; width: 5px; margin-left: 206px;">
        </div>
        <div id="row21" style="float: left; clear: left; height: 5px; width: 5px; margin-left: 206px;">
        </div>
        <div id="row22" style="float: left; clear: left; height: 5px; width: 5px; margin-left: 206px;">
        </div>
        <div id="row23" style="float: left; clear: left; height: 5px; width: 5px; margin-left: 207px;">
        </div>
```

-continued

```
<div id="row24" style="float: left; clear: left; height: 5px; width: 5px; margin-left: 209px;">
</div>
<div id="row25" style="float: left; clear: left; height: 5px; width: 5px;">
</div>
<div id="row26" style="float: left; clear: left; height: 5px; width: 5px; margin-left: 210px;">
</div>
<div id="row27" style="float: left; clear: left; height: 5px; width: 5px; margin-left: 211px;">
</div>
<div id="row28" style="float: left; clear: left; height: 5px; width: 5px; margin-left: 211px;">
</div>
<div id="row29" style="float: left; clear: left; height: 5px; width: 5px; margin-left: 211px;">
</div>
<div id="row30" style="float: left; clear: left; height: 5px; width: 5px;">
</div>
<div id="row31" style="float: left; clear: left; height: 5px; width: 5px;">
</div>
<div id="row32" style="float: left; clear: left; height: 5px; width: 5px; margin-left: 214px;">
</div>
<div id="row33" style="float: left; clear: left; height: 5px; width: 5px; margin-left: 215px;">
</div>
<div id="row34" style="float: left; clear: left; height: 5px; width: 5px; margin-left: 215px;">
</div>
<div id="row35" style="float: left; clear: left; height: 5px; width: 5px; margin-left: 215px;">
</div>
<div id="row36" style="float: left; clear: left; height: 5px; width: 5px; margin-left: 215px;">
</div>
<div id="row37" style="float: left; clear: left; height: 5px; width: 5px;">
</div>
<div id="row38" style="float: left; clear: left; height: 5px; width: 5px;">
</div>
<div id="row39" style="float: left; clear: left; height: 5px; width: 5px; margin-left: 216px;">
</div>
<div id="row40" style="float: left; clear: left; height: 5px; width: 5px; margin-left: 217px;">
</div>
<div id="row41" style="float: left; clear: left; height: 5px; width: 5px;">
</div>
<div id="row42" style="float: left; clear: left; height: 5px; width: 5px; margin-left: 219px;">
</div>
<div id="row43" style="float: left; clear: left; height: 5px; width: 5px; margin-left: 220px;">
</div>
<div id="row44" style="float: left; clear: left; height: 5px; width: 5px; margin-left: 220px;">
</div>
<div id="row45" style="float: left; clear: left; height: 5px; width: 5px;">
</div>
<div id="row46" style="float: left; clear: left; height: 5px; width: 5px; margin-left: 220px;">
</div>
<div id="row47" style="float: left; clear: left; height: 5px; width: 5px; margin-left: 220px;">
</div>
<div id="row48" style="float: left; clear: left; height: 5px; width: 5px;">
</div>
<div id="row49" style="float: left; clear: left; height: 5px; width: 5px; margin-left: 220px;">
</div>
<div id="row50" style="float: left; clear: left; height: 5px; width: 5px; margin-left: 220px;">
</div>
<div id="row51" style="float: left; clear: left; height: 5px; width: 5px; margin-left: 219px;">
</div>
<div id="row52" style="float: left; clear: left; height: 5px; width: 5px; margin-left: 219px;">
</div>
<div id="row53" style="float: left; clear: left; height: 5px; width: 5px; margin-left: 219px;">
</div>
<div id="row54" style="float: left; clear: left; height: 5px; width: 5px; margin-left: 219px;">
</div>
<div id="row55" style="float: left; clear: left; height: 5px; width: 5px;">
</div>
<div id="row56" style="float: left; clear: left; height: 5px; width: 5px; margin-left: 221px;">
</div>
<div id="row57" style="float: left; clear: left; height: 5px; width: 5px; margin-left: 224px;">
</div>
<div id="row58" style="float: left; clear: left; height: 5px; width: 5px; margin-left: 226px;">
</div>
<div id="row59" style="float: left; clear: left; height: 5px; width: 5px;">
</div>
<div id="row60" style="float: left; clear: left; height: 5px; width: 5px; margin-left: 230px;">
</div>
<div id="row61" style="float: left; clear: left; height: 5px; width: 5px;">
</div>
<div id="row62" style="float: left; clear: left; height: 5px; width: 5px; margin-left: 234px;">
</div>
```

```
<div id="row63" style="float: left; clear: left; height: 5px; width: 5px; margin-left: 238px;">
</div>
<div id="row64" style="float: left; clear: left; height: 5px; width: 5px; margin-left: 241px;">
</div>
<div id="row65" style="float: left; clear: left; height: 5px; width: 5px;">
</div>
<div id="row66" style="float: left; clear: left; height: 5px; width: 5px; margin-left: 248px;">
</div>
<div id="row67" style="float: left; clear: left; height: 5px; width: 5px;">
</div>
<div id="row68" style="float: left; clear: left; height: 5px; width: 5px; margin-left: 253px;">
</div>
<div id="row69" style="float: left; clear: left; height: 5px; width: 5px; margin-left: 257px;">
</div>
<div id="row70" style="float: left; clear: left; height: 5px; width: 5px;">
</div>
<div id="row71" style="float: left; clear: left; height: 5px; width: 5px; margin-left: 258px;">
</div>
<div id="row72" style="float: left; clear: left; height: 5px; width: 5px;">
</div>
<div id="row73" style="float: left; clear: left; height: 5px; width: 5px;">
</div>
<div id="row74" style="float: left; clear: left; height: 5px; width: 5px;">
</div>
<div id="row75" style="float: left; clear: left; height: 5px; width: 5px; margin-left: 268px;">
</div>
<div id="row76" style="float: left; clear: left; height: 5px; width: 5px; margin-left: 269px;">
</div>
<div id="row77" style="float: left; clear: left; height: 5px; width: 5px; margin-left: 271px;">
</div>
<div id="row78" style="float: left; clear: left; height: 5px; width: 5px; margin-left: 273px;">
</div>
<div id="row79" style="float: left; clear: left; height: 5px; width: 5px; margin-left: 274px;">
</div>
<div id="row80" style="float: left; clear: left; height: 5px; width: 5px;">
</div>
<div id="row81" style="float: left; clear: left; height: 5px; width: 5px;">
</div>
<div id="row82" style="float: left; clear: left; height: 5px; width: 5px;">
</div>
<div id="row83" style="float: left; clear: left; height: 5px; width: 5px; margin-left: 267px;">
</div>
<div id="row84" style="float: left; clear: left; height: 5px; width: 5px; margin-left: 268px;">
</div>
<div id="row85" style="float: left; clear: left; height: 5px; width: 5px; margin-left: 268px;">
</div>
<div id="row86" style="float: left; clear: left; height: 5px; width: 5px;">
</div>
<div id="row87" style="float: left; clear: left; height: 5px; width: 5px; margin-left: 255px;">
</div>
<div id="row88" style="float: left; clear: left; height: 5px; width: 5px; margin-left: 255px;">
</div>
<div id="row89" style="float: left; clear: left; height: 5px; width: 5px; margin-left: 271px;">
</div>
<div id="row90" style="float: left; clear: left; height: 5px; width: 5px; margin-left: 282px;">
</div>
<div id="row91" style="float: left; clear: left; height: 5px; width: 5px; margin-left: 273px;">
</div>
<div id="row92" style="float: left; clear: left; height: 5px; width: 5px; margin-left: 268px;">
</div>
<div id="row93" style="float: left; clear: left; height: 5px; width: 5px;">
</div>
<div id="row94" style="float: left; clear: left; height: 5px; width: 5px;">
</div>
<div id="row95" style="float: left; clear: left; height: 5px; width: 5px; margin-left: 269px;">
</div>
<div id="row96" style="float: left; clear: left; height: 5px; width: 5px;">
</div>
<div id="row97" style="float: left; clear: left; height: 5px; width: 5px; margin-left: 294px;">
</div>
<div id="row98" style="float: left; clear: left; height: 5px; width: 5px; margin-left: 295px;">
</div>
<div id="row99" style="float: left; clear: left; height: 5px; width: 5px; margin-left: 295px;">
</div>
<div id="row100" style="float: left; clear: left; height: 5px; width: 5px; margin-left: 296px;">
</div>
```

-continued

```
<div id="row101" style="float: left; clear: left; height: 5px; width: 5px; margin-left: 297px;">
</div>
<div id="row102" style="float: left; clear: left; height: 5px; width: 5px; margin-left: 298px;">
</div>
<div id="row103" style="float: left; clear: left; height: 5px; width: 5px; margin-left: 299px;">
</div>
<div id="row104" style="float: left; clear: left; height: 5px; width: 5px; margin-left: 300px;">
</div>
<div id="row105" style="float: left; clear: left; height: 5px; width: 5px; margin-left: 300px;">
</div>
<div id="row106" style="float: left; clear: left; height: 5px; width: 5px; margin-left: 301px;">
</div>
<div id="row107" style="float: left; clear: left; height: 5px; width: 5px; margin-left: 302px;">
</div>
<div id="row108" style="float: left; clear: left; height: 5px; width: 5px; margin-left: 302px;">
</div>
<div id="row109" style="float: left; clear: left; height: 5px; width: 5px; margin-left: 303px;">
</div>
<div id="row110" style="float: left; clear: left; height: 5px; width: 5px; margin-left: 304px;">
</div>
<div id="row111" style="float: left; clear: left; height: 5px; width: 5px; margin-left: 305px;">
</div>
<div id="row112" style="float: left; clear: left; height: 5px; width: 5px; margin-left: 305px;">
</div>
<div id="row113" style="float: left; clear: left; height: 5px; width: 5px;">
</div>
<div id="row114" style="float: left; clear: left; height: 5px; width: 5px; margin-left: 307px;">
</div>
<div id="row115" style="float: left; clear: left; height: 5px; width: 5px; margin-left: 307px;">
</div>
<div id="row116" style="float: left; clear: left; height: 5px; width: 5px;">
</div>
<div id="row117" style="float: left; clear: left; height: 5px; width: 5px; margin-left: 308px;">
</div>
<div id="row118" style="float: left; clear: left; height: 5px; width: 5px; margin-left: 308px;">
</div>
<div id="row119" style="float: left; clear: left; height: 5px; width: 5px; margin-left: 308px;">
</div>
<div id="row120" style="float: left; clear: left; height: 5px; width: 5px; margin-left: 308px;">
</div>
<div id="row121" style="float: left; clear: left; height: 5px; width: 5px; margin-left: 308px;">
</div>
<div id="row122" style="float: left; clear: left; height: 5px; width: 5px; margin-left: 307px;">
</div>
<div id="row123" style="float: left; clear: left; height: 5px; width: 5px; margin-left: 306px;">
</div>
<div id="row124" style="float: left; clear: left; height: 5px; width: 5px; margin-left: 306px;">
</div>
<div id="row125" style="float: left; clear: left; height: 5px; width: 5px; margin-left: 303px;">
</div>
<div id="row126" style="float: left; clear: left; height: 5px; width: 5px; margin-left: 302px;">
</div>
<div id="row127" style="float: left; clear: left; height: 5px; width: 5px; margin-left: 297px;">
</div>
<div id="row128" style="float: left; clear: left; height: 5px; width: 5px; margin-left: 290px;">
</div>
<div id="row129" style="float: left; clear: left; height: 5px; width: 5px; margin-left: 285px;">
</div>
<div id="row130" style="float: left; clear: left; height: 5px; width: 5px; margin-left: 283px;">
</div>
<div id="row131" style="float: left; clear: left; height: 5px; width: 5px; margin-left: 275px;">
</div>
<div id="row132" style="float: left; clear: left; height: 5px; width: 5px; margin-left: 270px;">
</div>
```

```
            <div id="row133" style="float: left; clear: left; height: 5px; width: 5px; margin-left: 266px;">
            </div>
            <div id="row134" style="float: left; clear: left; height: 5px; width: 5px; margin-left: 264px;">
            </div>
            <p>
This is random text about a guitar. A guitar is a fun instrument to play and a
good one to learn. For example, it is relatively portable and therefore you can
carry it easily.           </p>
            </p>
This type of guitar is an acoustic guitar and requires no amplifier to hear if you
are reasonably close to it. The strings are tuned E - A - D - G - B -
E.          </p>
            <p>
A guitar can be picked or strummed. To play a guitar right handed, the right
hand picks or strums the guitar, while the left hand finger or fingers press down
between the frets (the little dividers on the long neck) to change the pitch of the
note.         </p>
        </div>
```

The software creates a rich model of the user's intent while the user traces their finger on the screen, for example, a Bezier curve with a Kalman filter for the control points for the specific purpose of representing the imprecise movements of the user's shaking hand. This data may be saved in any suitable form for reproducing the trace, including by saving the stack of div elements, or at least their position data. Further, the position data of the stack of div elements may be compressed using some form of lossy run-length encoding or any other continuous curve (e.g. Bezier) after editing.

Figure 5:
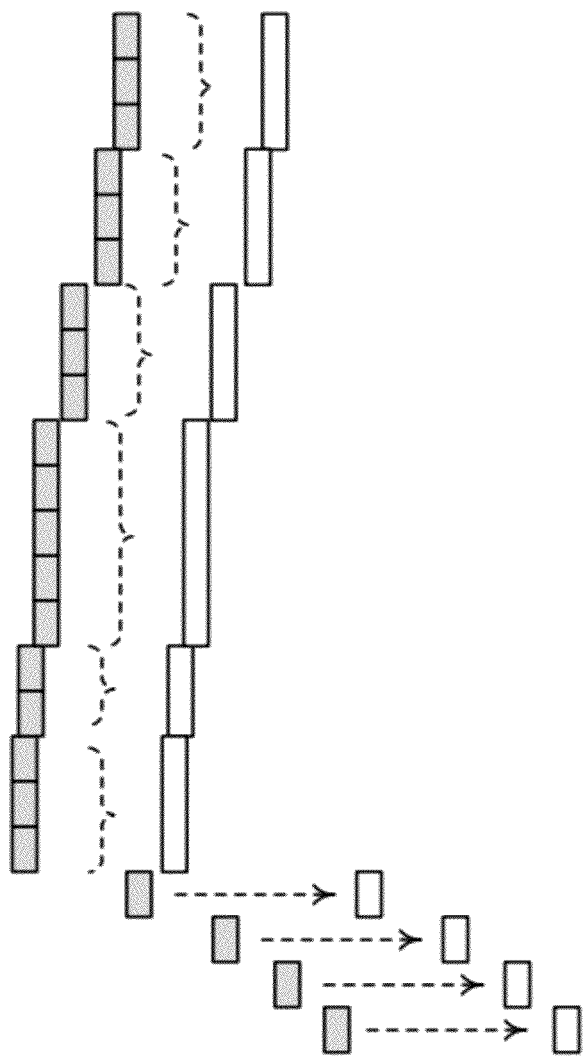
FIG. 5 is a representation of how aligned div elements may be encoded into a lesser number of total div elements.

FIGS. 4 and 5 show a simplified example of how run length encoding may be used to reduce the number of div elements. Aligned rectangles on the y-axis may be combined into a single rectangle with greater pixel height, eliminating at least one div element for each such alignment. Moreover, if rectangles are within a threshold distance (e.g., a number of pixels) of being aligned, they may be considered aligned in one implementation. This also effectively performs smoothing of the curve. In the simplified example of FIG. 5 where twenty-three div tags are represented by the shaded rectangles (before encoding), nineteen of those div tags (represented by the shaded rectangles to the left of the dashed brackets) have been encoded into six div tags (represented by the non-shaded rectangles to the right of the dashed brackets). There are four non-encoded div tags (below the dashed brackets, shaded before encoding, non-shaded after) for a total of ten in the compressed state (after encoding). A starting div element height that corresponds to (e.g., equals) the text line height may be used, particularly if the text line height is fixed.

Note that the threshold number of pixels may be user-configurable to an extent, e.g., a user can use a slider bar or the like to increase compression by trading off precision in the div tags' margins (e.g., the threshold number of pixels to be considered aligned), or vice-versa. The text line height/font size may be factored into the compression, e.g., the greater the text line height, the more the compression may be increased without changing the resulting flow.

To summarize, in the above example, along each line of text (using a wrapping algorithm of the browser), there is inserted a div element that is resized (e.g., its margin set) based on the user's input (e.g., finger gesture). That is, when the user traces an irregular boundary along an image, the div elements for each line of text are resized to reflect the portions of the image that are not to have any text on them, and because of the way the browser processes div elements, the text flows naturally around the outside of the spacing div elements.

It should be understood that the above description was only directed towards tracing a finger along one side of an irregular object such as image, with a JavaScript client running in a web browser by which the user has selected an image and entered some text. Many other gestures and/or implementations for the translation of an input gesture for flowing text based upon the gesture (e.g., around irregular shapes such as images) may produce a like result.

Other example gestures for text flow may be used. For example, instead of positioning the content to the right side of a gesture-determined boundary (e.g., following an image outline) as in FIGS. 2 and 3, the text may flow on the left side of the boundary. Note that to avoid having a browser/renderer insert a horizontal scrollbar when the right boundary is reached, the content pane boundary width may be fixed to some number of pixels. Div tags or the like may also be used to flow text vertically (to an extent) based upon a generally horizontal gesture.

The software may infer on which side of the image the text is to flow, such as based on whether the gesture is to the right or left of an imaginary line that divides the image. The user may correct an erroneous inference, e.g., by dragging the text.

Another way is to have the user explicitly inform the software, e.g., via multi-touch input, the user may hold a finger down to the left of the gesture-input curve as a reference point while tracing the curve with a finger of the other hand, meaning to flow the text to the right of the gesture; holding a finger down to the right of the gesture means to flow the text on the left. A more explicit user interface (e.g., a radio button) may be used.

A gesture may be used to shape text. For example, a user may draw a triangle or circle via a gesture, with the text fit inside the user's drawn shape. Note that the shape may be adjusted to correct any drawings irregularities, e.g., a "triangle" shape with irregular lines may be corrected into a triangle with three straight lines, an approximate circle may be replaced by a correct circle, and so on.

Figure 6:
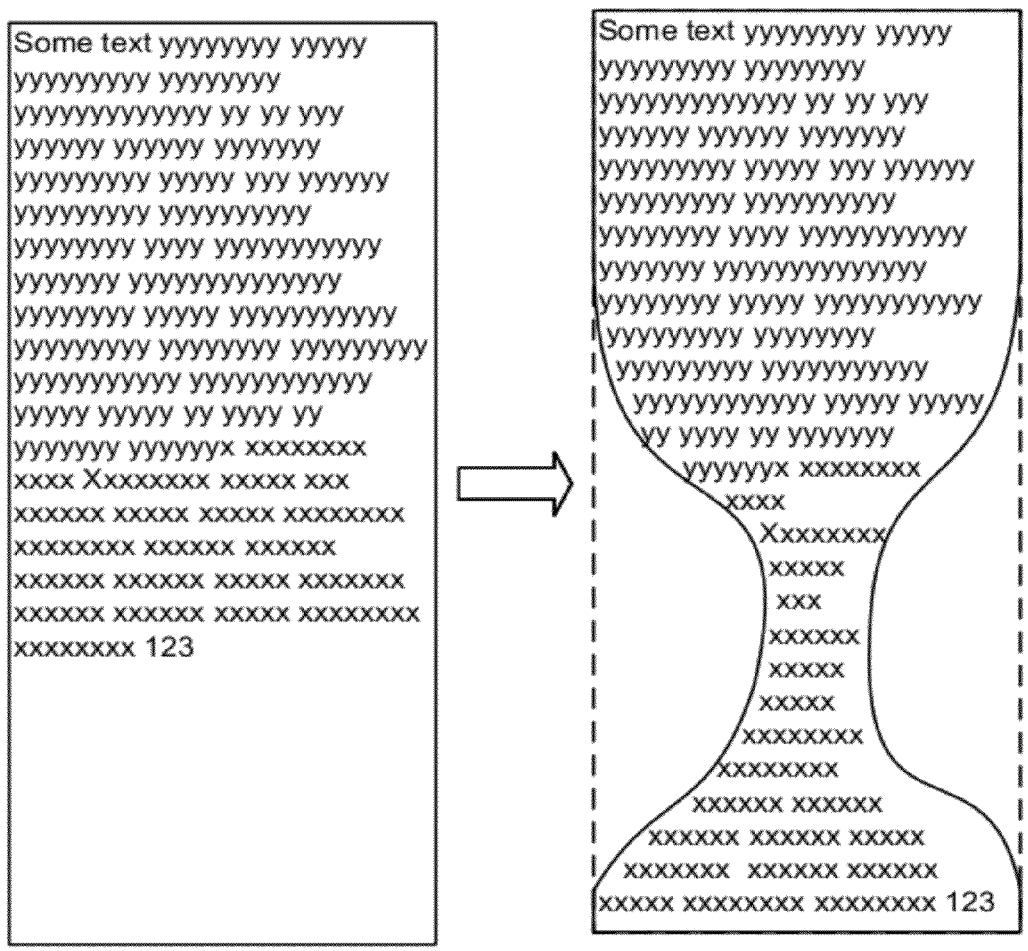
FIG. 6 is a representation of how gesture input (e.g., a pinching gesture) may be used to modify a shape and the position of content elements within that modified shape.

Thus, another implementation allows the user to modify a real or imaginary region (e.g., by a one-handed or two-handed pinching gesture, or a double gesture) to define the shape of whitespace areas into which text is to flow. For example, this region initially may be in the shape of a box containing the image, and as the user applies a multi-touch gesture, the region changes shape, and allows text to flow along the convex hull of the image, as generally represented in FIG. 6. The user may use gestures to resize, reshape, rotate and/or otherwise modify a shape, and any initial shape may be used, e.g., a rectangle as in FIG. 6, a triangle, a circle, an ellipse, and so forth;

It should be noted that the generation and/or modification of code based upon gesture input is not limited to div tags. For example, gestures may be used to move images and text within a region, such as to build a web page. Effectively, this is done by interpreting the gesture to modify existing elements (e.g., their positions) and/or insert new elements into code (and/or possibly remove elements).

Once a boundary has been drawn, a user may transform an image (e.g., by translation, rotation, scaling) through a body of text, and the software will automatically flow the text based upon the transformed image, e.g., by correspondingly modifying the gesture coordinates or inferring new gesture coordinates. The user can "fling" or drag an image through a body of text to a desired position, and have the software automatically flow the text around a previously drawn image boundary. For a flinging action, the motion of the image object may follow a natural physically-plausible path as if driven by a spring or gravity, and another finger can serve to provide a location at which the motion is to stop. Similarly, the flinging speed, distance and/or timing (of dragging before releasing) may be used to position the object. Rotations and scaling can be performed by multi-touch gestures, with the text flow updating incrementally as the image transforms with the user's gesture.

Another alternative is to allow partitioning a body of text into two (or more) pieces, by a gesture (e.g., multi-touch gesture) that splits text at a particular location.

As can be seen, there is described the use of a real-world physical gesture for a complicated user-interaction task that results in code being generated and/or complex actions being computed. This includes gesturing by tracing a finger or other pointing device along a curvy path on a device's screen to communicate to a piece of software data corresponding to a complicated page layout of how text is flow around images or other irregular shapes. Much richer information is passed to the software with such a gesture than the simple idioms adapted from mouse device usage (e.g. press, move, zoom).

EXEMPLARY OPERATING ENVIRONMENT

Figure 7:
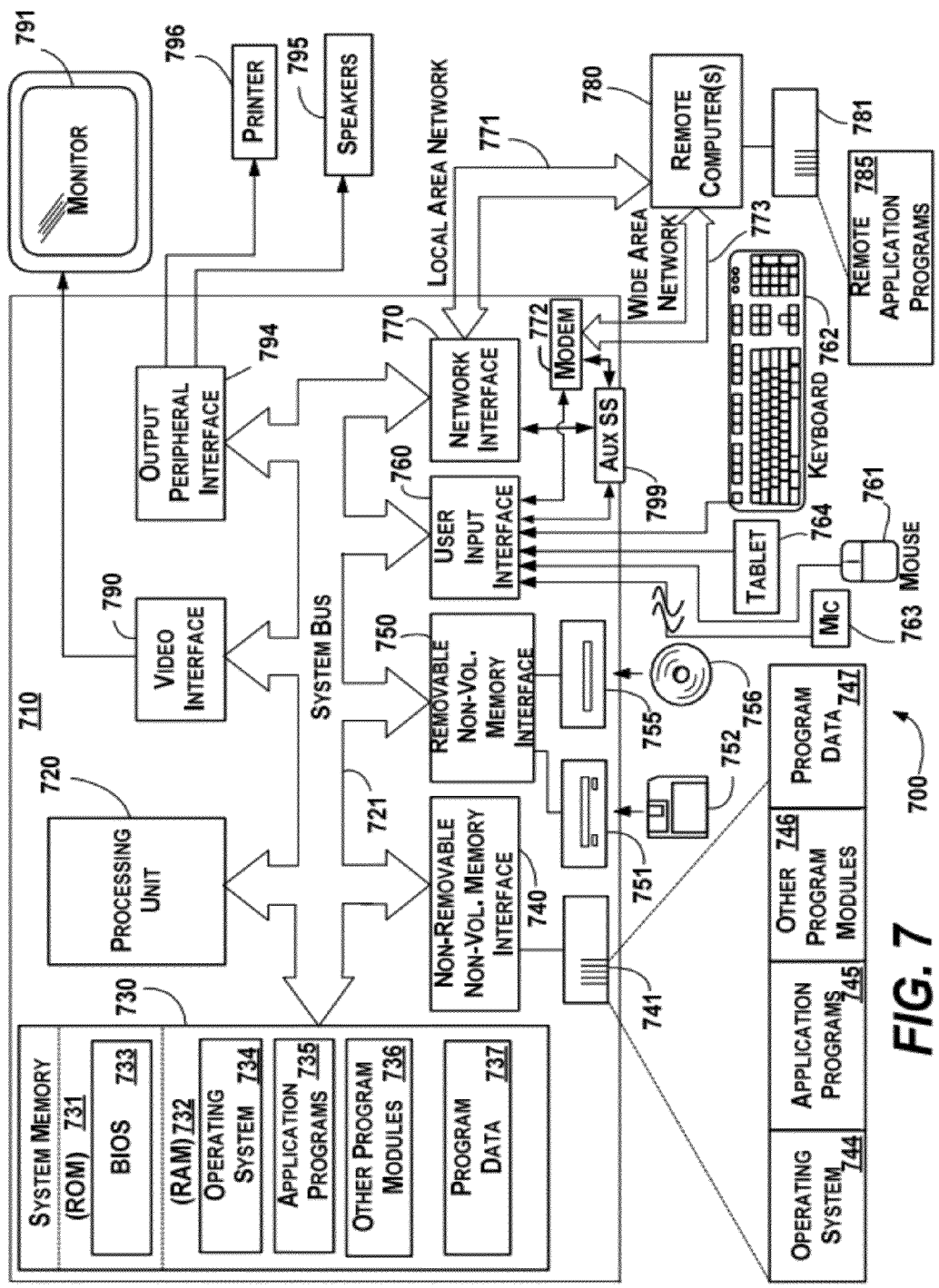
FIG. 7 is a block diagram representing an exemplary computing environment into which aspects of the subject matter described herein may be incorporated.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
   a sensing mechanism configured to provide data corresponding to gesture input; and
   logic configured to process the data to automatically position one or more content elements relative to a gesture curve of the gesture input while a gesture corresponding to the gesture input is still in progress, by:
   generating div elements in hypertext markup language (HTML) code with margins set to values that position the one or more content elements based on the gesture curve of the gesture input;
   aligning a set of at least two vertically adjacent div elements that are within a threshold alignment distance of one another into an aligned set; and
   encoding the aligned set into a single div element with an increased height.

2. The system of claim 1 wherein the gesture curve traces a curve relative to an image contour, wherein the content elements comprise text, and wherein the logic processes the data to flow the text relative to the curve to appear to flow content based upon a gesture trace of the image contour.

3. The system of claim 1 wherein the logic is further configured to:
adjust a shape of a content element based upon drawn shape data received via other gesture input.

4. The system of claim 1 wherein the sensing mechanism comprises a touch-sensitive display, and wherein the gesture input corresponds to a finger or stylus gesture.

5. The system of claim 1 wherein the sensing mechanism comprises a pointing device, and wherein the gesture input corresponds to pointing device movement.

6. The system of claim 1 wherein the sensing mechanism comprises a depth camera-based technology, and wherein the gesture input corresponds to an air gesture.

7. The system of claim 1 wherein the logic infers where to position the one or more content elements relative to the gesture curve of the gesture input based upon a left or right position of the gesture input relative to an imaginary center line, wherein the imaginary center line is a line of reference.

8. The system of claim 1 wherein the logic determines where to position the one or more content elements relative to the gesture curve of the gesture input based upon secondary input.

9. The system of claim 1 wherein the sensing mechanism comprises a touch-sensitive display, wherein the gesture input corresponds to a pinching, stretching or rotation gesture, and wherein the logic performs translation, scaling or rotation, or any combination of translation, scaling or rotation to modify a shape containing the one or more content elements into a modified shape, and positions the one or more content elements relative to the modified shape.

10. The system of claim 1 wherein the gesture input traces a curve relative to a displayed object, wherein the displayed object is moved to a changed position, and wherein the logic repositions the one or more content elements relative to the changed position.

11. In a computing environment, a computer-implemented method comprising:
receiving data corresponding to gesture input, the data including one or more sets of coordinates relative to a gesture trace of a curve corresponding to a content contour;
generating markup language code based upon the gesture input, including the one or more sets of coordinates; and
processing the markup language code to render output that is based at least in part upon the gesture input to automatically position one or more content elements while a gesture corresponding to the gesture input is still in progress.

12. The computer-implemented method of claim 11 wherein the markup language code comprises hypertext markup language (HTML) elements associated with position data, and wherein processing the markup language code to render output that is based at least in part upon the gesture input comprises rendering output that positions the one or more content elements relative to the gesture input.

13. The computer-implemented method of claim 11 wherein the markup language code comprises hypertext markup language (HTML) div elements associated with margin data that is set based upon the gesture input, and wherein processing the markup language code to render output that is based at least in part upon the gesture input comprises rendering output that flows text relative to the gesture input.

14. The computer-implemented method of claim 13 further comprising:
saving information corresponding to the margin data, including run-length encoding the data of at least two div elements that are aligned within a threshold alignment distance of one another.

15. The computer-implemented method of claim 11 wherein the data corresponding to the gesture input is received from a depth sensing device, and wherein the gesture input is sensed without physical contact.

* * * * *